United States Patent
Wooters et al.

(10) Patent No.: US 11,289,085 B2
(45) Date of Patent: Mar. 29, 2022

(54) AUTOMATIC TURN DELINEATION IN MULTI-TURN DIALOGUE

(71) Applicant: Microsoft Technology Licensing, LLC, Redmond, WA (US)

(72) Inventors: Charles Clayton Wooters, Livermore, CA (US); Steven Andrew Wegmann, Berkeley, CA (US); Michael Jack Newman, Somerville, MA (US); David Leo Wright Hall, Berkeley, CA (US); Jean Crawford, Cambridge, MA (US); Laurence Steven Gillick, Newton, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 163 days.

(21) Appl. No.: 16/696,849

(22) Filed: Nov. 26, 2019

(65) Prior Publication Data
US 2021/0158812 A1    May 27, 2021

(51) Int. Cl.
  *G10L 15/22*    (2006.01)
  *G10L 15/05*    (2013.01)
  (Continued)

(52) U.S. Cl.
  CPC .............. *G10L 15/22* (2013.01); *G10L 15/05* (2013.01); *G10L 15/1815* (2013.01); *G10L 15/1822* (2013.01); *G10L 15/197* (2013.01)

(58) Field of Classification Search
  CPC ....... G10L 15/22; G10L 15/26; G10L 15/063; G10L 15/30; G10L 15/183; G10L 15/197;
  (Continued)

(56) References Cited

U.S. PATENT DOCUMENTS 10,672,383 B1 *  6/2020  Thomson ............... G10L 15/183
10,971,153 B2 *  4/2021  Thomson ............... G10L 15/187
(Continued)

OTHER PUBLICATIONS

Antoine Raux et al., ("Optimizing Endpointing Thresholds Using Dialogue Features in Spoken Dialogue system") Proceedings of the 9th SIGdial Workshop in Dsicourse and Dialogue, Jume 2008, pp. 1-10. (Year: 2008).*

(Continued)

*Primary Examiner* — Vijay B Chawan
(74) *Attorney, Agent, or Firm* — Alleman Hall Creasman & Tuttle LLP

(57) ABSTRACT

A method of automatically delineating turns in a multi-turn dialogue between a user and a conversational computing interface. Audio data encoding speech of the user in the multi-turn dialogue is received. The audio data is analyzed to recognize, in the speech of the user, an utterance followed by a silence. The utterance is recognized as a last utterance in a turn of the multi-turn dialogue responsive to the silence exceeding a context-dependent duration dynamically updated based on a conversation history of the multi-turn dialogue and features of the received audio, wherein the conversation history includes one or more previous turns of the multi-turn dialogue taken by the user and one or more previous turns of the multi-turn dialogue taken by the conversational computing interface.

20 Claims, 6 Drawing Sheets

(51) Int. Cl.
*G10L 15/18* (2013.01)
*G10L 15/197* (2013.01)

(58) Field of Classification Search
CPC ......... G10L 15/28; G10L 15/32; G10L 15/06; G10L 15/187; G10L 2015/0631; G10L 2015/226; G10L 2025/786; G10L 25/48; G10L 25/78; G06F 40/279; G06F 40/30; G06F 40/44
USPC .............................. 704/270, 270.1, 231, 233
See application file for complete search history.

(56) References Cited

U.S. PATENT DOCUMENTS

| | | | |
|---|---|---|---|
| 2015/0348570 A1* | 12/2015 | Feast ................. | G06Q 10/0639 704/270 |
| 2018/0090127 A1* | 3/2018 | Hofer ...................... | G10L 25/87 |
| 2018/0091027 A1* | 3/2018 | Pfeffer .................. | H01R 39/64 |
| 2019/0318759 A1* | 10/2019 | Doshi ..................... | G10L 15/05 |
| 2019/0348065 A1* | 11/2019 | Talwar .................... | G10L 15/22 |
| 2020/0175962 A1* | 6/2020 | Thomson .............. | G10L 15/183 |

OTHER PUBLICATIONS

"International Search Report and Written Opinion Issued in PCT Application No. PCT/US20/057592", dated Feb. 17, 2021, 12 Pages.

Raux, et al., "Optimizing Endpointing Thresholds Using Dialogue Features in a Spoken Dialogue System", In Proceedings of the 9th SIGdial Workshop on Discourse and Dialogue, Jun. 2008, pp. 1-10.

\* cited by examiner

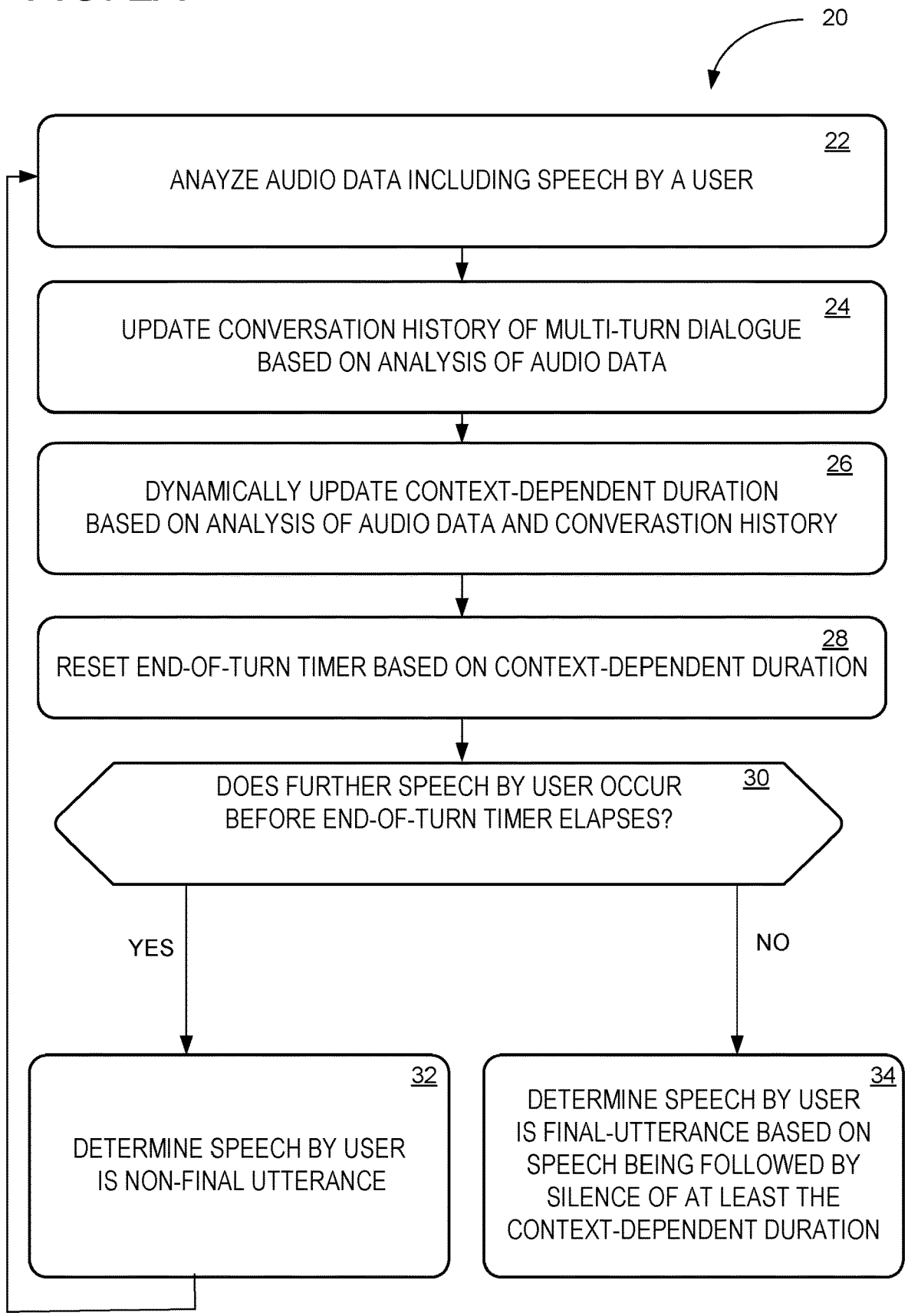

FIG. 3A

CONVERSATION HISTORY OF MULTI-TURN DIALOGUE 106'

USER TURN 108A
- UTTERANCE 108A1: Schedule a flight to Boston for tomorrow.
- SILENCE 108A1: No user speech detected for 5 seconds

COMPUTER TURN 110A
- RESPONSE 110A1: There are two options: tomorrow at 8 AM and tomorrow at 12 PM. Which time do you prefer?

USER TURN 108B
- UTTERANCE 108B1: I guess I prefer the... Hmmm....
- SILENCE 108B2: No user speech detected for 45 seconds

COMPUTER TURN 110B
- RESPONSE 110B1: I didn't catch that. I still need to know which flight time you prefer for tomorrow's flight. The options are 8 AM or 12 PM.

USER TURN 108C
- UTTERANCE 108C1: 8 AM
- SILENCE 108C2: No user speech detected for 1 seconds

COMPUTER TURN 110C
- RESPONSE 110C[1]: OK. I booked you a ticket for the 8 AM flight tomorrow.

FIG. 3B

CONVERSATION HISTORY OF MULTI-TURN DIALOGUE 106"

USER TURN 108A

| USER UTTERANCE 108A1 | Schedule a flight to Boston for tomorrow. |
|---|---|
| SILENCE 108A2 | No user speech detected for 2 seconds |

COMPUTER TURN 110A

| RESPONSE 110A1 | There are two options: tomorrow at 8 AM and tomorrow at 12 PM. Which time do you prefer? |
|---|---|

USER TURN 108B

| USER UTTERANCE 108B1 | Finally... I'll get a small coffee, to-go. Thanks. |
|---|---|
| OTHER SPEAKER UTTERANCE 108B2 | OK! That'll be two dollars. I'll have it ready at the counter in a minute! |
| SILENCE 108B3 | No user speech detected for 4 seconds |
| USER UTTERANCE 108B4 | 8AM |
| SILENCE 108B5 | No user speech detected for 1 seconds |

COMPUTER TURN 110B

| RESPONSE 110B1 | OK. I can schedule the flight for 8 AM. You have a free upgrade to first class available. Would you like to use the free upgrade to book a first class ticket? |
|---|---|

USER TURN 108C

| USER UTTERANCE 108C1 | Put me in... hmm... |
|---|---|
| OTHER SPEAKER UTTERANCE 108C2 | Here you go! Cream and sugar? |
| USER UTTERANCE 108C3 | No thanks. |
| SILENCE 108C4 | No user speech detected for 5 seconds |
| USER UTTERANCE 108C5 | ...Yeah, book first class, I guess. |
| SILENCE 108C6 | No user speech detected for 2 seconds |

COMPUTER TURN 110B

| RESPONSE 110C1 | OK, I booked a first class ticket for the 8 AM flight. |
|---|---|

AUTOMATIC TURN DELINEATION IN MULTI-TURN DIALOGUE

BACKGROUND

Conversational computing interfaces may conduct dialogues with one or more users, for example to assist the users by answering queries. A conversational computing interface may conduct dialogues spanning multiple turns, including user turns in which a user speaks one or more utterances, and computer turns in which the conversational computing interface responds to one or more previous user turns.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

In a method of automatically delineating turns in a multi-turn dialogue between a user and a conversational computing interface, audio data encoding speech of the user in the multi-turn dialogue is received. The audio data is analyzed to recognize, in the speech of the user, an utterance followed by a silence in the speech of the user. The utterance is recognized as a last utterance in a turn of the multi-turn dialogue responsive to the silence exceeding a context-dependent duration dynamically updated based on a conversation history of the multi-turn dialogue and features of the received audio. The conversation history includes one or more previous turns of the multi-turn dialogue taken by the user and one or more previous turns of the multi-turn dialogue taken by the conversational computing interface.

BRIEF DESCRIPTION OF THE DRAWINGS

FIG. 2A shows a method of assessing whether user speech is followed by a silence in user speech exceeding a dynamically-updated, context-dependent duration.

FIG. 3A-3B show examples of conversations including user utterances, silences, and responses by a conversational computing interface.

DETAILED DESCRIPTION

Figure 1:
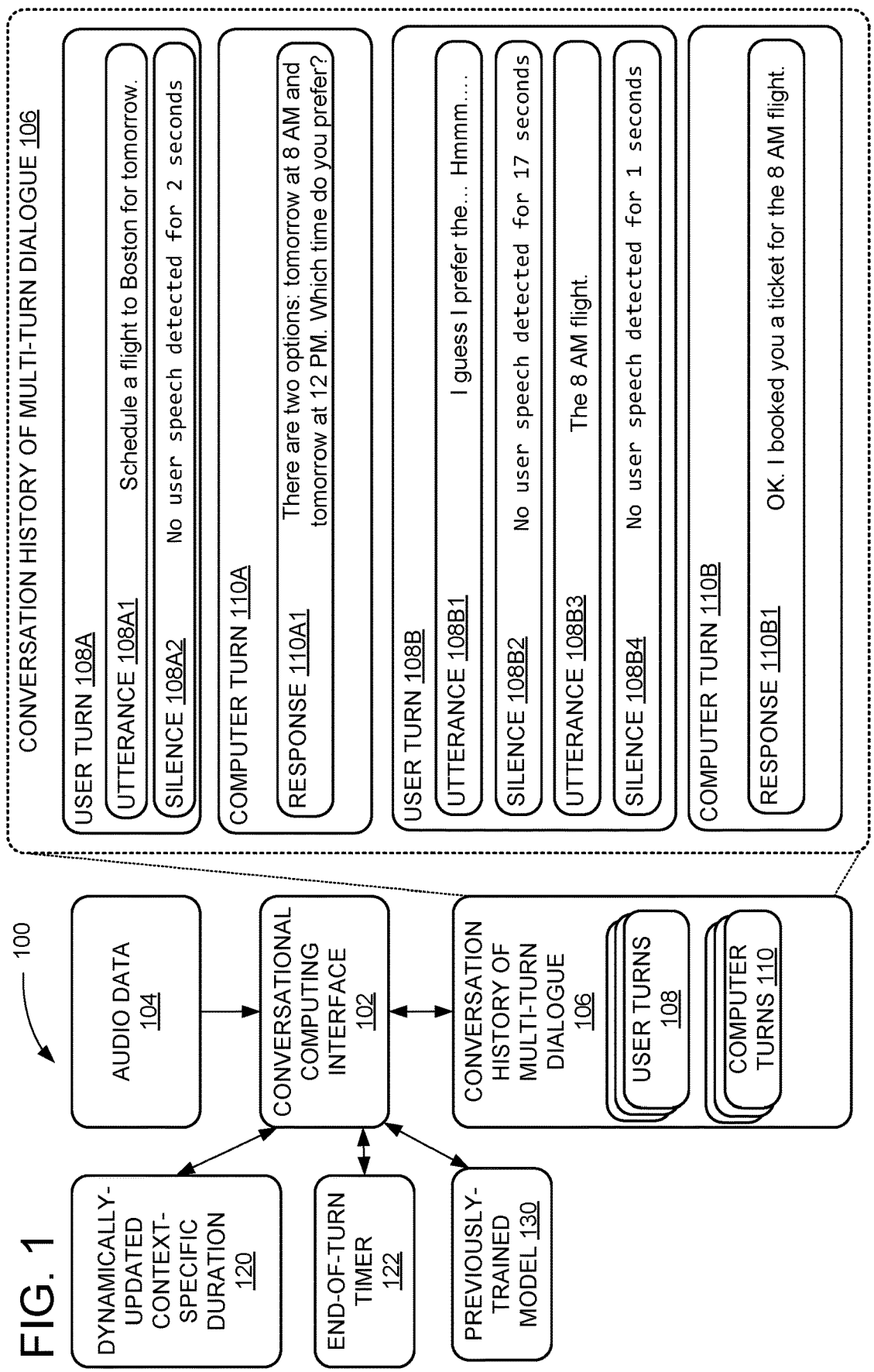
FIG. 1 shows an exemplary data-flow for a conversational computing interface.

Conversational computing interfaces enable human users to interact with computers in a natural manner. A properly trained conversational computing interface is able to process natural user interactions such as spoken user utterances or written user commands, without requiring the user to use a particular syntax defined by the computer. This allows the human user to use natural language when addressing the computer. For example, the user may interact using natural language by asking the computer to answer a question or by giving the computer a command. In response, the conversational computing interface is trained to automatically perform actions, such as answering questions or otherwise assisting a user (e.g., booking tickets for an airline flight responsive to a user utterance such as "Book a flight for tomorrow at 8 AM").

Conversational computing interfaces may be configured to respond to various user interaction events. Non-limiting examples of events include user utterances in the form of speech and/or text, button presses, network communication events (e.g., receiving a result of an application programming interface (API) call), and/or gesture inputs. More generally, events include any occurrences that may be relevant to user interaction and that are detectable by a conversational computing interface, for example via input/output hardware (e.g., microphones, cameras, keyboards, and/or touch-screens), communication hardware, and the like. Such events may be represented in a computer-readable format, such as a text string generated by a speech-to-text interpreter or screen coordinate values associated with touch inputs.

Conversational computing interfaces may respond to a user utterance or any other user interaction event by performing a suitable action. Conversational computing interface actions may be implemented by executing any suitable computer operations, for example outputting synthesized speech via a speaker, and/or interacting with other computer technologies via APIs. Non-limiting examples of actions include finding search results, making purchases, and/or scheduling appointments. Conversational computing interfaces may be configured to perform any suitable actions to assist a user. Non-limiting examples of actions include performing computations, controlling other computers and/or hardware devices, (e.g., by invoking an API), communicating over networks (e.g., to invoke an API), receiving user input (e.g., in the form of any detectable event), and/or providing output (e.g., in the form of displayed text and/or synthesized speech). More generally, actions may include any behaviors that a computer system is configured to perform. Other non-limiting examples of actions include controlling electronic devices (e.g., turning on/off lights in a user's home, adjusting a thermostat, and/or playing multimedia content via display/speakers), interacting with commercial and/or other services (e.g., invoking an API to schedule a ride via a ride-hailing service and/or ordering food/packages via a delivery service), and/or interacting with other computer systems (e.g., to access information from a website or database, send an email, and/or access a user's schedule in a calendar program).

In some examples, conversational computing interfaces may conduct multi-turn dialogues with one or more users, for example to assist the users by answering queries. A conversational computing interface may conduct dialogues spanning multiple turns, including user turns in which a user speaks one or more utterances, and computer turns in which the conversational computing interface responds to one or more previous user turns. "Turn" refers herein to any collection of user interface events representing input by a user in a multi-turn dialogue. For example, a turn may include a collection of one or more utterances. "Utterance" may be used herein to refer to any span of audio and/or text representing speech by a user, for example, a span of audio for which an automatic speech recognition (ASR) system produces a single result. Non-limiting examples of utterances include words, sentences, paragraphs, and/or any suitable representation of speech by a user. In some examples, utterances may be obtained by processing audio data with any suitable ASR system. The ASR system may be configured to segment user speech into one or more separate utterances (e.g., separated by silences).

To better conduct multi-turn dialogues, a conversational computing interface should be able to accurately detect the end of a user turn. However, a single user turn may include more than one separate utterance separated by periods of user silence. As used herein, "silence" can refer to a span of time when speech by a particular user of interest is not detected in the audio data, even though other sounds or even speech by other human speakers may be detected in the audio data during that span of time. In some examples, a silence optionally may include a span of time when an ASR system fails to recognize specific utterances by a user, even though the user may be making non-verbal sounds (e.g., humming, sighing, or speaking filler words such as "hm" or "umm."). However, in some examples, such user sounds and/or filler words may be processed in the same way as recognized words.

Although an ASR system may be suitable for segmenting user speech into utterances, the segmentation of the user speech by the ASR system may not correspond to suitable turn boundaries. For example, when a user's turn includes more than one utterance, although an ASR system may be configured for segmenting the user's turn into a plurality of utterances, the ASR system would not be configured to assess which utterance, of the plurality of utterances, actually corresponds to the end of the user's turn. As such, if the end of an utterance detected by the ASR system is treated as the end of the user's turn, the user's turn may be prematurely determined to be ended before the user is finished talking, potentially resulting in interruptions to the user. For example, it is believed that 25-30% of human conversation "turns" in task-oriented conversations (e.g., where the user is trying to accomplish a specific plan or goal) include silences of greater than 0.5 seconds. As such, although an ASR system may be suitable for segmenting human speech into utterances, silences between the utterances may need to be taken into account in order to accurately delineate user turns.

The conversational computing interface may be configured to avoid interrupting a user during the user's turn, and wait to trigger responses/actions after the user finishes with an utterance (e.g., so as to allow for the user to potentially continue speaking in a subsequent utterance). In some examples, a conversational computing interface may detect the end of a user turn based on a silence in the user's speech exceeding a predefined duration (e.g., a user's turn is considered finished after a 2 second silence). However, user turns may include silences in the middle of user speech. For example, a user may stop to think, or the user may be interrupted by a different task or by interaction with another speaker. More generally, a user turn may include one or more utterances, separated by silences. Although the user may be silent between each utterance, the user turn may not be finished until after the last utterance. As such, the end of a turn may be pre-maturely detected when a user is not yet finished speaking, resulting in an interruption of the user. Furthermore, if the predefined silence duration is made longer (e.g., 10 seconds), although the user may not be as frequently interrupted, responses by the conversational computing interface may be delayed due to the longer silence duration. When interacting with such conversational computing interfaces, the user may experience annoyance due to being interrupted, waiting, and/or pre-planning speech to avoid waiting or interruptions (e.g., attempting to speak without pausing).

Accordingly, a method for automatically delineating turns in a multi-turn dialogue between a user and a conversational computing interface dynamically updates a context-specific duration used to assess the end of a user turn based on the user utterance and/or other context established by a conversation history of the multi-turn dialogue.

Automatically delineating turns, as disclosed herein, advantageously enables a conversational computing interface to wait a suitable duration for user speech to finish, thus improving the user experience. For example, accurate turn delineation helps avoid interrupting the user by waiting a suitable length of time when the user may not be finished speaking, while also responding to the user quickly by waiting a shorter duration when the user is likely to be finished speaking.

As a non-limiting example, the context-dependent duration may be dynamically updated based on the specific content of the user utterance. As an example, when the user is responding to a specific question (e.g., providing specific details pertaining to the conversational computing interface enacting a previous request), the user may be given a longer period of time to think of an answer to the specific question. As another example, a longer context-dependent duration may be dynamically selected if the user uses filler words (e.g., "hmm" or "um")

FIG. 1 shows an exemplary data flow architecture 100 including a conversational computing interface 102 configured to automatically delineate turn boundaries by automatically detecting the end of a user turn in a multi-turn dialogue. Conversational computing interface 102 is configured to receive audio data 104, for example audio data including user speech output by a microphone listening to one or more speakers. Conversational computing interface 102 is configured to maintain a conversation history 106 of a multi-turn dialogue between the conversational computing interface 102 and one or more users. Conversational computing interface 102 automatically detects the end of the user turn based on a silence in the user speech exceeding a context-dependent duration 120 that is dynamically updated based on audio data 104 and further based on conversation history 106. By using the dynamically-updated context-dependent duration 120, conversational computing interface 102 may avoid interrupting the user when there are silences in the user's speech, while also processing user requests quickly when the user is finished speaking.

Conversational computing interface 102 may include one or more microphones configured to output audio data. For example, conversational computing interface 102 may include an array of directional microphones configured to listen to speech, output audio data, and to assess a spatial location corresponding to one or more utterances in the audio data. In some examples, an assessed spatial location may be used to recognize a speaker in the audio data (e.g., to distinguish between nearby speakers based on the assessed spatial location). In some examples, conversational computing interface 102 may include one or more audio speakers configured to output audio responses (e.g., utterances by the conversational computing interface in response to user utterances, such as descriptions of actions performed by the conversational computing interface).

Conversational computing interface 102 is configured to dynamically update context-dependent duration 120 based on features of audio data 104 and/or based on conversation history 106. In general, the features may be provided to a previously-trained model 130 configured to dynamically select a context-dependent duration 120 based on any suitable set of features. For example, the features may include acoustic features of audio data 104, and/or natural language and/or text features derived from audio data 104. Furthermore, conversation history 106 may track any suitable acoustic, natural language, and/or text features throughout a multi-turn dialogue. However, although conversation history 106 may track various features throughout the multi-turn dialogue, in general, features in conversation history 106 such as natural language and/or text features may not fully reflect features of the user's voice and/or speech delivery. Accordingly, the previously-trained model 130 is configured to analyze acoustic features of audio data 104 so as to take the features of the user's voice and/or speech delivery into account. By taking into account audio data 104 as well as conversation history 106, previously-trained model 130 may achieve relatively higher accuracy for assessing whether a turn is ended, as compared to an assessment based only on audio data 104 or based only on conversation history 106.

In some examples, the features of audio data 104 include one or more acoustic features. For example, the one or more acoustic features may include an instantaneous speaking pitch of the user, a baseline speaking pitch of the user, and/or an intonation of the user relative to a baseline speaking pitch of the user. The baseline speaking pitch of the user may be determined in any suitable fashion, e.g., based on a baseline speaking pitch tracked with regard to a most recent utterance by the user, and/or tracked in a conversation history 106 for the user in a current conversation and/or in previous conversation(s) with the user. In examples, instantaneous speaking pitch may be determined based in on any suitable acoustic analysis, e.g., based on mel-frequency cepstral coefficients of audio data 104 data. In examples, baseline speaking pitch may be assessed based on a rolling window average of instantaneous speaking pitch, and/or maximum and/or minimum pitch range. Intonation of the user relative to the baseline speaking pitch of the user may be assessed in any suitable fashion, for example, by a frequency difference between an instantaneous speaking pitch of the user during audio data 104 as compared to a baseline speaking pitch of the user.

In some examples, the features of audio data 104 (e.g., acoustic features of audio data 104) include a speaking rate of the user. For example, the speaking rate may be determined by counting a number of words detected by an ASR system, and dividing by a duration of an utterance. In some examples, the one or more acoustic features include one or more of 1) a baseline speaking rate for the user, 2) a speaking rate of the user in the utterance, and 3) a difference between a speaking rate of the user in the utterance and a baseline speaking rate for the user. Alternately or additionally, the features of audio data 104 may include a speaking rate or speaking rate difference in an ending portion of the utterance. The speaking rate may be selectively measured for the ending portion of the utterance in any suitable fashion, for example, by measuring speaking rate for a predefined portion of the utterance (e.g., the last ¼ or the last ½), by measuring speaking rate for a predefined duration of the utterance (e.g., the last 3 seconds), and/or based on measuring speaking rate after an inflection point and/or change in the speaking rate (e.g., after speaking rate begins to rise or drop).

In addition to speaking pitch and/or speaking rate, the context-dependent duration 120 may be set based on any other suitable acoustic features of audio data 104. Non-limiting examples of acoustic features include duration of utterance, speech amplitude, and/or duration of words within the utterance.

In some examples, the previously-trained model 130 is configured to assess textual and/or natural language features recognized for audio data 104 (e.g., lexical, syntactic and/or semantic features derived from user utterance(s) in audio data 104), in addition to acoustic features of audio data 104. Accordingly, the context-duration may be set based on features of audio data 104 including one or more text-based features automatically derived from audio data 104. For example, the textual and/or natural language features may be recognized by any suitable natural language model. As a non-limiting example, a natural language feature may include an end-of-sentence probability of a final n-gram in the utterance. In some examples, the end-of-sentence probability of the final n-gram may be derived from a natural language model operating on audio data 104. In some examples, the end-of-sentence probability of the final n-gram may be derived from the natural language model operating on an output of an ASR system operating on the audio data 104 (e.g., the natural language model may process the utterance based on recognized text instead of and/or in addition to audio data). For example, words such as "and" and "the" may be unlikely at the end of an English language sentence, having a lower associated end-of-sentence probability. More generally, the natural language features may include a syntactic role of a final word in a sentence, e.g., adjective, noun, or verb. For example, the end of a turn may be more strongly associated with some syntactic roles (e.g., nouns may be more common at the end of a user turn, as compared to adjectives). Accordingly, the features of audio data 104 may include syntactic properties of a final n-gram in the utterance.

In some examples, the features of audio data 104 include an automatically-recognized filler word from a pre-defined list of filler words. For example, the pre-defined list of filler words may include non-verbal utterances such as "um," "uh," or "er." As another example, the pre-defined list of filler words may include words and/or phrases that may be associated with a user finishing a thought, e.g., "just a second," or "let me think." In some examples, textual and/or natural language features of audio data 104 may include automatically-recognized filler words in the audio data 104. As shown in FIG. 1, the context-dependent duration 120 may allow for a relatively longer silence 108B2 based on utterance 108B1 including a filler word, "hmmm."

In addition to acoustic and/or natural language/text features of audio data 104, the context-dependent duration 120 may be dynamically set based on any suitable context established in the conversation history 106 of the multi-turn dialogue, e.g., based on any suitable features of previous user turns and/or conversational computing interface responses. In some examples, dynamically setting the context-dependent duration based on the conversation history 106 is based at least on a semantic context derived from one or both of 1) a previous utterance by the user in conversation history 106 and 2) a previous utterance by the conversational computing interface in conversation history 106. The semantic context may be assessed by any suitable model(s) (e.g., artificial intelligence (AI), machine learning (ML), natural language processing (NLP), and/or statistical model(s). As a non-limiting example of using semantic context to dynamically set a suitable context-dependent duration, if conversational computing interface 102 is waiting for specific information (e.g., an answer to a clarifying question, a request to confirm an action, and/or any other details from the user), then a relatively long silence may be allowed before conversational computing interface 102 takes a turn. For example, as shown in FIG. 1, the conversational computing interface 102 is waiting for specific information about a preferred flight schedule and allows for a relatively long silence 108B2 between user utterance 108B1 (in which the user has not yet provided all of the required information) and user utterance 108B3, while also allowing for a shorter silence 108B4 after user utterance 108B3 (at which point the user has provided the required information).

More generally, for any acoustic and/or text features described herein (e.g., speaking pitch, speaking rate, word choice, etc.), features may be extended to include derived features based on comparing against a baseline for a feature, comparing a change in a feature over time, selectively measuring a feature towards the end of user utterances, etc., for example as described above with regard to baseline speaking pitch and speaking rate at the end of user utterances. In some examples, the features of audio data 104 include one or more features of the utterance, selectively measured for an ending portion of the utterance. For example, speaking pitch may be selectively measured at the end of an utterance (similar to speaking rate). In some examples, dynamically setting the context-dependent duration based on conversation history 106 is based at least on a measurement of a change in a feature occurring throughout the utterance. As a non-limiting example, speaking pitch may be measured starting after an inflection point at which speaking pitch stops rising and starts dropping, or selectively measured starting after a point at which speaking pitch drops more than a threshold amount. In some examples, features of the audio data 104 may include pre-processed results including one or more utterances obtained from an ASR system. For example, the one or more utterances may include portions of the audio segmented by the ASR system and/or corresponding natural-language information related to audio data 104. In some examples, the ASR system is a pre-configured ASR system (e.g., the ASR system does not need to be specially trained and/or configured to work with the conversational computing interface and/or previously-trained model described herein). In some examples, utterances from the ASR system may be pre-processed with speaker recognition and/or addressee recognition, so as to determine, for each user utterance, a speaker who spoke that user utterance, and an addressee who the speaker intended to address in the utterance. For example, the ASR system may be configured to assess speaker and/or addressee identity associated with each utterance. In some examples, the pre-processed utterances may be provided selectively to the previously-trained model for analysis of audio data 104 to dynamically assess the context-dependent duration. For example, the pre-processed utterances may be filtered to provide only utterances by a particular user which are addressed to the conversational computing interface, while excluding other utterances that are spoken by other users and/or addressed to entities other than the conversational computing interface. In other examples, the pre-processed and/or un-processed utterances may all be provided to the previously-trained model for analysis, e.g., with input features denoting a speaker and/or addressee for each utterance.

In some examples, spans of time when an ASR system fails to recognize specific utterances by a user may be treated as silences in the user speech, even though the user may be making non-verbal sounds (e.g., humming, sighing, or speaking filler words such as "hm" or "umm."). In other examples, non-verbal sounds and/or other user interface events may not be treated as silences. For example, non-verbal sounds may be taken into account as acoustic features of the audio data 104 (e.g., features for measuring pitch, volume, and/or rate of utterance of non-verbal sounds). For example, if a user begins humming or speaking to a different entity (e.g., to another human), the previously-trained model is configured to assess, based on features of the audio data 104 and/or conversation history 106, that the user has ended the turn. For example, if a user utterance is fully actionable by the conversational computing interface and the user immediately starts humming, the previously-trained model may be configured to assess that the turn is ended (e.g., because the user is no longer speaking to the conversational computing interface). Alternately, in other examples (e.g., based on different features of conversation history 106) the previously-trained model may be configured to infer that the user is not finished with the turn, but is humming during a silence (e.g., while thinking). Similarly, in some examples, if a user begins addressing a different entity, the previously-trained model is configured to assess, based on features of the audio data 104 and/or conversation history 106, that the user's turn is over (e.g., when a user begins speaking to someone else after completing a fully-actionable utterance). In other examples, if the user begins addressing a different entity, the previously-trained model is configured to assess, based on features of the audio data 104 and/or conversation history 106, that the speech addressed at the other entity is a silence in the user's turn (e.g., the user may resume speaking to the conversational computing interface after attending to the other entity).

In some examples, audio may be received via an array of directional microphones, and the conversational computing interface may be configured to assess, based on the audio, a directional/positional information associated with an utterance in the audio. For example, the directional/positional information associated with an utterance may be a feature used in the determination of a speaker and/or addressee associated with an utterance. For example, a position associated with utterances from the user may be tracked throughout a conversation to assess whether the utterance arises from the user. Alternately or additionally, the position of the user may be assessed based on any other suitable information, e.g., based on a position of one or more sensors associated with a mobile device of the user. Similarly, positions of other speakers may be tracked based on audio data 104, and the position information may be used in an assessment of speaker identity for utterances in audio data 104. As another example, the conversational computing interface may be configured to assess a direction associated with an utterance (e.g., based on sounds associated with the utterance being received at different microphones with different volumes and/or receipt times). Accordingly, the direction associated with the utterance may be used as a feature for assessing a speaker and/or addressee of the utterance. For example, if a user is speaking to the conversational computing interface, they may emit speech sounds primarily in a first direction (e.g., towards a microphone of the conversational computing interface), whereas when the user is speaking to a different entity, the user may emit speech sounds primarily in a second, different direction. Similarly, sound frequencies, amplitude/volume, and/or other characteristics captured by the one or more microphones may be assessed to determine the speaker identity and/or addressee associated with an utterance in any suitable fashion. For example, a user may speak to the conversational computing interface at a first volume level, while speaking to other entities at other volume levels (e.g., due to speaking directly into a microphone when speaking to the conversational computing interface, vs. speaking at a different angle relative to the microphone when speaking to other entities). Furthermore, addressee detection may be based on timing of an utterance, e.g., if an utterance by the user briefly follows an utterance by a different entity, the utterance by the user may be a response to the utterance by the different entity, which is addressed to that different entity.

Previously-trained model 130 may include any suitable ensemble or any other combination of one or more previously-trained AI, ML, NLP, and/or statistical models. Non-limiting examples of models will be described below with regard to FIG. 4.

Previously-trained model 130 may be trained on any suitable training data. In general, the training data includes exemplary audio data and corresponding conversation history data, along with any suitable features derived from the audio and/or conversation history. In other words, the training data includes features similar to the features of audio data 104 and/or conversation history 106. In an example, the training data includes one or more exemplary utterances along with corresponding audio data and conversation history data, with each utterance being labelled to indicate whether the utterance is a final utterance of a user turn or a non-final utterance of a user turn. Accordingly, a model may be trained to reproduce the label (e.g., to predict whether or not a complete turn has occurred) based on the features. For example, previously-trained model 130 is configured to predict whether or not an end of turn has occurred based on features of audio data 104 and/or based on conversation history 106, with regard to a duration of a silence following an utterance in the audio data 104.

As an example, in response to a particular user utterance in which the user says, "Schedule a flight to Boston for tomorrow," previously-trained model 130 may initially assess that an end of turn has not yet occurred when the user has just finished speaking. However, if the user utterance is followed by a brief silence (e.g., after a 0.5 second silence), conversational computing interface 102 is configured to operate previously-trained model 130 again to re-assess whether a turn has occurred with regard to the duration of the silence following the utterance. Accordingly, previously-trained model 130 may determine that the end of turn has occurred based on the silence following the utterance. Even if previously-trained model 130 determines that the turn is not yet ended, conversational computing interface 102 is configured to continue using previously-trained model 130 to re-assess whether the turn has ended. For example, previously-trained model 130 may determine that the turn is ended if a longer silence (e.g., a 2 second silence) occurs following the utterance.

In some examples, the training data may be domain specific, e.g., travel planning, calendar, shopping, and/or appointment scheduling. In some examples, the training data may include a plurality of domain-specific training data sets for different domains. In some examples, the training data may be domain agnostic, e.g., by including one or more different sets of domain-specific training data. In some examples, the model(s) may include one or more model(s) trained on the different sets of domain-specific training data. In some examples, the previously-trained natural language model is a domain-specific model of a plurality of domain-specific models, wherein each domain-specific module is trained on a corresponding domain-specific plurality of exemplary task-oriented dialogues. In some examples, the model(s) may include a combination and/or ensemble of different domain-specific models.

For example, the training data may include a plurality of exemplary task-oriented dialogues, each exemplary task-oriented dialogue including one or more turns of an exemplary user. For example, the previously-trained natural language model may be configured to classify utterances followed by silences as either being final utterances (e.g., the final utterance and any subsequent silence delineating the end of a user turn) or as being non-final utterances (e.g., where the user turn includes further utterances, separated by silences). The exemplary task-oriented dialogues may be derived from any suitable conversations. As a non-limiting example, the exemplary dialogues may be derived from task-oriented conversations between two humans. Alternately or additionally, the model(s) may be trained on task-oriented conversations between three or more humans, task-oriented conversations between one or more humans and one or more conversational computing interfaces, and/or non-task-oriented dialogues between humans and/or conversational computing interfaces.

Conversation history 106 may be represented in any suitable form, e.g., as a list, array, tree, and/or graph data structure. In general, conversation history 106 represents one or more user turns 108 and one or more computer turns 110. In some examples, the user turns 108 and/or computer turns 110 may be recorded in a sequence and/or organized according to a temporal order in which the turns occurred, for example with timestamps and/or indices indicating the temporal order.

Conversation history 106 is expanded at the right side of FIG. 1 to show a non-limiting example for a multi-turn dialogue. Conversation history 106 includes a first user turn 108A, a first computer turn 110A in which the conversational computing interface 102 responds to the user based on the first user turn 108A, a second user turn 108B, and a second computer turn 110B in which the conversational computing interface 102 responds to the user based on the previous turns.

Although FIG. 1 shows a conversation history 106 including an explicit representation of silences (e.g., including a silence duration indicating the amount of time in which user speech was not detected), a conversation history 106 may represent silences in any suitable fashion and/or omit silences entirely. In some examples, silences may be implicitly recorded in conversation history 106 based on information associated with utterances in conversation history 106. For example, each utterance may be associated with a start time, a stop time, and/or a duration, such that silence durations are implicitly represented by a difference between times/durations associated with the utterances. Alternately or additionally, each word within each utterance may be associated with time/duration information, and accordingly silences between utterances are implicitly represented by a difference between times associated with a word at the end of an utterance and a word at the start of a subsequent utterance. For example, instead of representing user turns with a sequence of utterances separated by silences, a conversation history may represent user turns with a sequence of utterances. Furthermore, user turns may include one or more utterances in any suitable representation. For example, although conversation history 106 shows utterances as text, utterances may be represented within user turns with any suitable combination of text, speech audio, phonetic data, natural language embeddings, etc. More generally, a turn may include any number of utterances optionally separated by silences, as with user turn 108B including utterance 108B1, silence 108B2, utterance 108B3, and silence 108B4.

FIG. 1 shows conversation history 106 in a state after several turns between the user and conversational computing interface 102. Although not explicitly shown in FIG. 1, conversation history 106 may be built up as audio data 104 is received, e.g., by automatically recognizing speech from audio data 104 in order to store user utterance text corresponding to user turns. For example, conversation history 106 may be initially empty, then gradually extended to include user turn 108A, computer turn 110A, user turn 108B, and computer turn 110B as they occur. Furthermore, conversation histories may be maintained in any suitable fashion for multi-turn dialogues including one or more conversational computing interfaces and one or more users, across any suitable number of turns. For example, each utterance in a conversation history may be labelled to indicate a specific user who spoke that utterance (e.g., as determined by voice recognition, face recognition, and/or directional microphones). For example, conversation history 106 may be extended with subsequent turns by conversational computing interface 102 and one or more users. Furthermore, although FIG. 1 shows a conversation history 106 in which user turns are already delineated, user turns may be dynamically delineated (e.g., as audio data 104 is received) based on recognizing a last utterance followed by a silence having a duration exceeding the context-dependent duration 120 that is dynamically updated as described herein.

In some examples, a turn may include a conversational computing interface response, e.g., response 110A1 and response 110B1 of computer turns 110A and 110B respectively. Alternately or additionally, computer turns may include any other suitable information related to a conversational computing interface action, e.g., executable code for responding to the user, and/or data values resulting from performing actions, executing code and/or invoking APIs.

Conversational computing interface 102 is configured to automatically delineate turns in a multiturn dialogue. In order to delineate turns, the conversational computing interface assesses whether an utterance by a user is a last utterance in a turn. If the utterance is the last utterance, the end of the utterance marks the end of one turn and the beginning of a subsequent turn. The conversational computing interface does not use a static approach to delineate turns, such as waiting for the silence after speech to exceed a fixed duration. Instead, the conversational computing interface assesses whether an utterance is the last utterance in a particular turn based on a context-specific duration 120 that is dynamically updated/changed based on both a conversation history 106 and features of audio data 104.

The context-dependent duration 120 may be dynamically updated to a longer or shorter duration, based on utterances by the user in audio data 104 and based on the conversation history 106. For example, conversational computing interface 102 may be configured dynamically update the context-dependent duration 120 based at least on more recent acoustic features of audio data 104 and/or conversation history 106. For example, previously-trained model 130 may be configured to selectively assess different portions of audio data 104. In an example, previously-trained model 130 may be configured to calculate an overall assessment based on a weighted combination of individual assessments of different portions of the audio data. Alternately or additionally, previously-trained model 130 may be configured to assess a timestamp feature associated with audio data 104 in conjunction with other features (e.g., so that the assessment of the other features by previously-trained model 130 is contextualized by the timestamp feature data). Accordingly, previously-trained model 130 may be configured to base the overall assessment on a suitable weighted combination that selectively weights one or more particular portions of the audio data. For example, weight parameters for the weighted combination may be learned during training, e.g., by adjusting the weight parameters to selectively assess one or more portions of the audio data according to a suitable weighted combination. In an example, previously-trained model 130 is configured to selectively assess an ending portion of audio data 104 and/or conversation history 106 (for example, a final portion of the audio data defined in any suitable manner, such as a duration such as 1 second, 2 seconds, or 10 seconds; or a final portion of an utterance in the audio data, such as the last 30% of the utterance or a time corresponding to the last three words in the utterance). In some examples, previously-trained model 130 is configured to selectively assess a plurality of different portions of the audio data (e.g., features corresponding to the first 20%, the last 20%, the last 10%, and the last word of the audio data, as one non-limiting example). Accordingly, previously-trained model 130 may be configured (e.g., via training) to assess the context-dependent duration 120 based on the features for the different portions of the audio data.

If a silence of at least the context-dependent duration is detected, conversational computing interface 102 is configured to determine that the user's turn is over. By selecting a relatively longer context-dependent duration 120 for a particular context, conversational computing interface 102 allows for a user to remain silent for a relatively longer time and then resume speaking, without being interrupted by conversational computing interface 102. For example, the relatively longer context-dependent duration 120 may be selected based on the particular context being associated with longer silences (e.g., because the user may take more time to think about answers with regard to that context). For example, when the user is in the middle of expressing details about a decision such as an airline booking as in utterance 108B1, conversational computing interface 102 is configured to recognize that the user turn is ended after a silence having a relatively longer context-dependent duration 120 (e.g., silence 108B2 of 17 seconds, or an even longer silence). For example, as described herein, conversational computing interface 102 is configured to operate previously-trained model 130 to assess whether an utterance followed by a silence is a final utterance, delineating an ended user turn. In some examples, previously-trained model 130 may assess that the utterance followed by the silence is a non-final utterance (e.g., the turn is not yet ended). If the silence continues for a longer duration, conversational computing interface 102 may be configured to continually operate previously-trained model 130 to re-assess whether the utterance is a final utterance of the turn, based on the utterance being followed by the silence of the longer duration. Accordingly, the context-dependent duration 120 may be effectively determined by previously-trained model 130 based on continually re-assessing whether an utterance followed by a silence is a final utterance as the silence continues and the duration of the silence increases.

Similarly, by selecting a relatively shorter context-dependent duration 120 for a particular context, conversational computing interface 102 may quickly process user requests without causing the user to wait. For example, when the user has expressed pertinent details that are actionable by the conversational computing interface 102, as in utterance 108B3 specifying the 8 AM flight, the conversational computing interface 102 is configured to select a relatively shorter context-dependent duration 120, so as to move onto a computer turn 110B after a short silence (e.g., silence 108B4 of 1 second, or an even shorter silence).

Conversational computing interface 102 may assess whether user speech includes a silence greater than the context-specific duration 120 in any suitable fashion. As a non-limiting example, conversational computing interface 102 may maintain an end-of-turn timer 122. End-of-turn timer 120 may take on any time duration value between a zero value (e.g., zero seconds) and the context-specific duration 120. In general, as user speech is detected in audio data 104, the context-specific duration 120 may be continually updated based on the user speech and based on the conversation history 106, e.g., so that the context-specific duration 120 is a dynamically-updated value that depends on context established by the user speech and/or the conversation history 106. Furthermore, each time user speech is detected in audio data 104, the end-of-turn timer 122 may be reset to zero, e.g., because by definition, the detected user speech in audio data 104 is not a silence in user speech. If user speech is not detected in audio data 104 (e.g., if a silence in user speech occurs), the end-of-turn timer 122 may be incremented and/or advanced in any suitable fashion, e.g., so as to reflect an observed silence duration in which user speech is not detected. If user speech is not detected in audio data 104 for a sufficiently long duration, the end-of-turn timer 122 may exceed the context-dependent duration 120. Responsive to the end-of-turn timer 122 exceeding the context-dependent duration 120, conversational computing interface 102 is configured to assess that a silence of the context-duration 120 occurred in the audio data 104. Accordingly, conversational computing interface 102 may determine that the user's turn has ended. The present disclosure includes a non-limiting example of assessing whether a silence of at least the dynamically-updated context-specific duration 120 occurs by maintaining end-of-turn timer 122. Alternately or additionally, an assessment of whether the silence of at least the dynamically-updated context-specific duration 120 occurs may be implemented in any suitable manner. For example, instead of maintaining an end-of-turn timer 122, conversational computing interface 102 may assess silence duration based on timestamp values associated with user speech and/or audio data 104. For example, conversational computing interface 102 may compare a current timestamp value against a previous timestamp value associated with the most recently detected speech by the user, in order to assess a silence duration as a difference between the current timestamp value and the previous timestamp value.

FIG. 2A shows an exemplary method 20 for assessing whether user speech is followed by a silence exceeding a dynamically-updated, context-dependent duration. Method 20 includes maintaining the dynamically-updated, context-dependent duration and maintaining an end-of-turn timer indicating a silence observed in audio data, and comparing the dynamically-updated, context-dependent duration with the end-of-turn timer. For example, method 20 may be used to determine whether speech by a user is a final utterance in a user's turn, based on recognizing that the utterance is followed by a silence of at least a context-dependent duration. Method 20 of FIG. 2A may be implemented by a conversational computing interface 102 of FIG. 1. For example, the conversational computing interface 102 may perform method 20 to maintain a dynamically-updated context-specific duration 120 and an end-of-turn timer 122.

At 22, method 20 includes analyzing audio data including speech by a user. For example, the analysis may include assessing one or more acoustic features of the audio data, performing ASR of the audio data, and/or assessing natural language and/or text features of the audio data (e.g., based on performing ASR). As an example, the audio data may be some to all of the audio data received in a conversation. Alternately or additionally, the audio data may include an incoming stream of audio data, e.g., audio data being captured and output by a microphone. For example, the incoming stream of audio data may be sampled to obtain a first portion of incoming audio, then subsequently re-sampled to obtain a second, subsequent portion of incoming audio following the first received portion. Accordingly, the analysis may be based on any suitable portion of the incoming stream of audio data. Analyzing the audio data may include detecting silences in the user speech, for any suitable criteria for identifying silences (e.g., as described above). At 24, method 20 includes updating a conversation history of a multi-turn dialogue based on the analysis of the audio data. For example, updating the conversation history may include recording one or more words in the speech, recording acoustic features of the speech, and/or recording a semantic context based on an intent of the user expressed in the speech.

At 26, method 20 includes dynamically updating a context-dependent duration based on the analysis of both the audio data and the conversation history. For example, the context-dependent duration may be determined based on an assessment of whether the user is likely finished talking based on the audio data, e.g., with a longer context-dependent duration if the user is assessed to likely not yet be finished talking. As another example, if the most recent speech by the user includes filler words such as "umm," the context-dependent duration may be dynamically updated to a larger value. The context-dependent duration may be dynamically updated based on any suitable assessment of features of the audio data and further based on the conversation history, e.g., by operating a previously-trained model on the audio data and conversation history. For example, conversational computing interface 102 of FIG. 1 is configured to provide audio data 104 and conversation history 106 to previously-trained model 130, in order to dynamically update the context-specific duration 120 based on results computed by previously-trained model 130.

At 28, method 20 includes resetting an end-of-turn timer based on the context-dependent duration, e.g., instantiating a timer by zeroing out a current time of the timer and configuring the timer to elapse after the context-dependent duration.

At 30, method 20 includes analyzing further audio data to assess whether further speech by the user occurs before the end-of-turn timer elapses. For example, analyzing further audio data may include continuously receiving further audio data output by a microphone, (e.g., an incoming audio stream), for example, so as to analyze user speech captured by the microphone in real time as the user speaks.

Responsive to detecting more user speech in the audio data before the end-of-turn timer elapses, method 20 includes, at 32, determining that the speech by the user is a non-final utterance of a user turn. Accordingly, method 20 further includes returning to 22, in order to analyze further audio data (e.g., further audio data including one or more subsequent utterances), and dynamically re-assess the context-dependent duration.

Responsive to detecting no more user speech in the audio data before the end-of-turn timer elapses, method 20 includes, at 34, determining that the speech by the user is a final utterance of the user's turn, based on recognizing that the speech by the user is followed by a silence of at least a context-dependent duration. Consequently, the user turn automatically may be delineated as ending with the determined final utterance.

Method 20 may be continually operated to analyze audio data, for example to analyze audio data as user speech is received in real-time via a microphone. For example, method 20 may be operated with regard to an initial portion of audio data in order to dynamically assess a context-dependent duration. The end-of-turn timer is run, and further audio is received/analyzed while the timer runs. As further audio is received/analyzed, method 20 may be operated to determine whether further user speech is detected before the end-of-turn timer elapses (e.g., resulting in re-assessing the context-dependent duration and resetting the timer). If the end-of-turn timer elapses based on the context-dependent duration without user speech being detected, then the speech by the user is determined to be a final utterance of a user turn.

As an example, returning to FIG. 1, method 20 may be operated on an initial portion of audio data 104 corresponding to user speech in user turn 108A, e.g., a portion of utterance 108A1 in which the user says "Schedule a flight." Based on the audio data 104 and the conversation history 106, conversational computing interface 102 is configured to provide audio data 104 and conversation history 106 as input to previously-trained model 130. Accordingly, based on audio data 104 and conversation history 106, previously-trained model 130 may dynamically determine an initial context-dependent duration of 3 seconds during which the user may specify further information related to the flight. Accordingly, the end-of-turn timer may be initially reset to 3 seconds. The end-of-turn timer may partially elapse, but before the full 3 seconds elapse, audio data 104 may include further speech by the user, saying " . . . to Boston for tomorrow." Accordingly, based on the further speech in the audio data 104, the conversational computing interface 102 may dynamically determine an updated context-dependent duration of 2 seconds and reset the end-of-turn timer to 2 seconds. Accordingly, if the end-of-turn timer elapses, with no further user speech within the 2 second duration as indicated by silence 108A2, the conversational computing interface 102 may determine that the speech by the user is a final utterance of the user's turn, based on recognizing that the speech by the user is followed by a silence of at least a context-dependent duration. Consequently, the user turn automatically may be delineated as ending with the determined final utterance.

As shown in conversation history 106, the multi-turn dialogue includes a user utterance 108A1 in which a user asks the conversational computing interface 102 to "Schedule a flight to Boston for tomorrow." After a 2 second silence 108A2, the conversational computing interface 102 responds in a computer turn 110A, including a response 110A1 informing the user that "There are two options: tomorrow at 8 AM and tomorrow at 12 PM," and asking which option the user prefers. Although not shown in FIG. 1, the conversational computing interface 102 may perform any suitable actions to ensure that response 110A1 is relevant, e.g., using one or more APIs associated with airline bookings to determine that the 8 AM and 12 PM option are available, using one or more APIs associated with user configuration settings to ensure the options are consistent with previously-specified user preferences (e.g., preferred airlines, cost constraints).

As described above, conversational computing interface 102 is configured to provide the conversation history 106 and audio data 104 to a previously-trained model 130 configured to dynamically update the context-specific duration 120 while the user speaks and/or while silence 108B2 occurs. As shown in FIG. 1, as a non-limiting example context-dependent duration 120 may be dynamically updated as 2 seconds. As a non-limiting example of possible factors in an assessment of the silence duration of 2 seconds by one or more previously-trained models, the previously-trained model(s) may determine that the turn is over after a relatively short 2 second silence based on the user utterance 108A1 being a complete sentence that includes an actionable request to schedule a flight to Boston.

Accordingly, in computer turn 110A, the conversational computing interface 102 informs the user that there are two options for scheduling the flight, and asks the user to choose a preferred option. In user turn 108B, the user initially starts talking in utterance 108B1 and then stops speaking during silence 108B2 with a duration of 17 seconds. However, despite the relatively long silence of 17 seconds, conversational computing interface 102 is configured to recognize that the user is not yet done with user turn 108B. As described above with reference to FIG. 2A, the conversational computing interface 102 may be configured to dynamically update the context-dependent duration to a relatively larger value (e.g., 20 seconds, 30 seconds, or any other suitable time), based on an assessment of features of audio data 104 and conversation history 106 by previously-trained model 130.

As a non-limiting example of possible factors in such an assessment, the user utterance 108B1 ends in a filler word ("hmmm"), and utterance 108B1 is not a complete sentence. Furthermore, utterance 108B1 does not specify a preference for the flight scheduling, but based on conversation history 106, the conversational computing interface 102 may expect the user to specify a preference based on response 110A1 in the previous computer turn 110A. Accordingly, conversational computing interface 102 is configured to recognize that user turn 108B includes further utterance 108B3. Furthermore, since utterance 108B3 does specify a preference for the flight scheduling, namely "the 8 AM flight," the conversational computing interface 102 is configured to recognize that the user is likely finished speaking (e.g., since conversational computing interface 102 has been given all of the information it needs to complete the action of scheduling the flight). Accordingly, based on the assessment of features of audio data 104 and conversation history 106 by previously-trained model 130, conversational computing interface 102 is configured to respond after a short silence 108B4 of only 1 second, with computer turn 110B including response 110B1 indicating that the flight has been successfully scheduled.

As shown in FIG. 1, conversational computing interface 102 is configured to dynamically update the context-dependent duration 120 to various durations, based on audio data 104 and/or conversation history 106. For example, after utterance 108A2 and after utterance 108B3, conversational computing interface 102 is configured to dynamically assess a relatively short (e.g., less than 3 seconds) duration of silence, for example based on features of audio data 104 and/or conversation history 106 associated with the user being finished speaking. Nevertheless, after utterance 108B1, even though the user stops talking for a relatively long silence 108B2 of 17 seconds, the conversational computing interface 102 is configured to dynamically allow for an even longer silence (e.g., by dynamically updating the context-specific duration to a larger value such as 20 seconds, and/or by continually re-assessing whether the turn is over while silence 108B2 occurs based on audio data 104 and/or conversation history 106). Accordingly, the conversational computing interface 102 avoids interrupting the user between utterance 108B1 and utterance 108B2, thereby letting the user finish speaking.

Although FIG. 1 shows silences with exemplary lengths such as 1 second, 2 seconds, or 17 seconds, the dynamically-updated context-dependent duration 120 may be any suitable duration, e.g., 0.25 seconds, 0.5 seconds, or any other suitable duration. In some examples, based on features of audio data 104 and/or conversation history 106, a conversational computing interface 102 may configured to assess a very short silence (e.g., 0.25 seconds, 0.1 seconds, or shorter) based on the features being associated with the user being finished speaking. For example, after user utterance 108B3 selecting "the 8 AM flight," conversational computing interface 102 may alternately be configured to begin computer turn 110B after a very short silence of only 0.1 seconds, for example based on the user fully specifying the "8 AM" option before the user even finishes uttering the word "flight," thereby allowing conversational computing interface 102 to output a response 110B1 quickly after the user finishes speaking. For example, in some examples, the context-dependent duration 120 may be zero seconds (e.g., no detectable duration of silence) or a very small duration (e.g., 1 millisecond or 1 microsecond). For example, previously trained model 130 may assess that a user's turn has ended before the end of a user utterance and/or immediately as a user utterance ends and before any silence in the user's speech occurs. As an example, if a user finishes speaking to conversational computing interface 102 and subsequent user speech is not addressed to conversational computing interface 102 (e.g., because the user is addressing a different entity, or "thinking aloud" by talking to himself).

Although FIG. 1 shows an example of a conversation history 106 with interaction via user utterances and computer response utterances, conversational computing interface 102 may be further configured to receive other user interaction events. Accordingly, although examples in the present disclosure are with regard to features derived from audio data and/or utterance text, the methods of the present disclosure may be similarly applied to any suitable user interaction events and features thereof. For example, detecting an end of turn for a conversational computing interface 102 that is configured to receive user interaction events in the form of button presses may be based on any suitable features, e.g., button presses, frequency of button presses towards the end of a span of time in which button presses were detected. Although the methods described herein are with regard to processing speech audio, textual features, and/or natural language features, it is believed that the methodology described herein (e.g., using one or more previously-trained models trained based on labelled data, such as previously-trained model 130 of FIG. 1) are similarly applicable to other user interaction events, e.g., natural language models may be configured to process sequence data representing any suitable collection of user interaction events occurring over a span of time, including user utterances, gestures, button presses, gaze direction, etc. For example, user gaze direction may be taken into account with regard to detecting a speaker and/or addressee of utterances by the user and/or other speakers. As another example, a previously-trained model may be configured to assess, based on features indicating the user gazing at a computer device associated with conversational computing interface 102 (e.g., a mobile phone), that the user turn is not yet over (e.g., because the user is using the computer device to find information that is pertinent to the user turn).

Figure 2B:
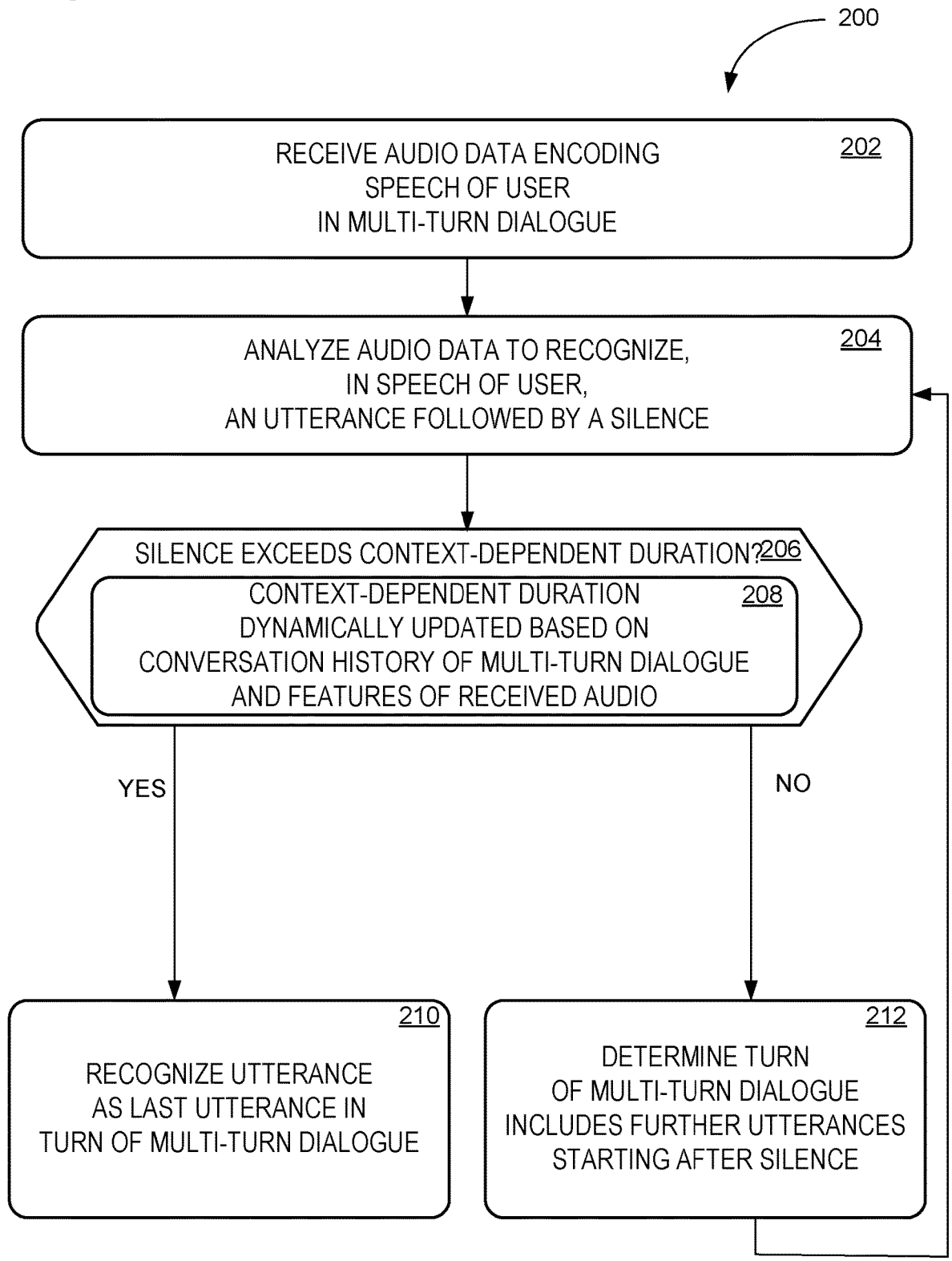
FIG. 2B shows a method of automatically delineating turn boundaries in a multi-turn dialogue.

The methods of the present disclosure (e.g., method 20) may be applied to delineate turn boundaries for any suitable conversational computing interface based on audio data and any suitable representation of conversation history. FIG. 1 shows one non-limiting example of a data-flow architecture for a conversational computing interface 102, along with a non-limiting example of conversation history 106. However, delineation of turn boundaries according to the present disclosure may be performed with regard to any suitable conversational computing interface with any suitable data-flow architecture (e.g., using a previously-trained model configured to use any suitable set of input features from audio data and/or a conversation history of the conversational computing interface). FIG. 2B shows an example method 200 for delineating turns in a multi-turn dialogue between a user and a conversational computing interface.

At 202, method 200 includes receiving audio data encoding speech of the user in the multi-turn dialogue. For example, the audio data may include one or more utterances by the user, separated by silences. The one or more utterances in the audio data may correspond to one or more turns. Accordingly, method 200 may detect the end of a turn based on the audio data and/or conversation history of the conversational computing interface.

At 204, method 200 includes analyzing the audio data to recognize, in the speech of the user, an utterance followed by a silence. Analyzing the audio data may include operating an ASR system. For example, the utterance may be one of a plurality of utterances separated by silences in the turn, and the plurality of utterances may be automatically supplied by the ASR system. In some examples, the ASR system may do some initial segmenting of utterances based on silences in the user speech. For example, the ASR system may be configured to automatically segment audio into separate utterances based on recognizing silences of a pre-defined threshold duration. However, as described above, a single user turn may comprise a plurality of utterances separated by silences. Accordingly, the methods of the present disclosure may be operated to suitably delineate turns comprising a plurality of utterances supplied by the ASR system.

At 206, method 200 includes recognizing the utterance as a last utterance in a turn of the multi-turn dialogue responsive to the silence exceeding a context-dependent duration dynamically updated based on a conversation history of the multi-turn dialogue and features of the received audio. As a non-limiting example, assessing whether the silence exceeds the context-dependent duration may be enacted according to method 20 as shown in FIG. 2A. The conversation history may be maintained in any suitable format, for example, to represent one or more previous turns of the multi-turn dialogue taken by the user and one or more previous turns of the multi-turn dialogue taken by the conversational computing interface as with the non-limiting example of conversation history 106 shown in FIG. 1. Returning to FIG. 2B, at 208, the context-dependent duration is dynamically updated based on the conversation history of the multi-turn dialogue and further based on features of the received audio. At 210, responsive to the silence exceeding the context-dependent duration as assessed at 206, method 200 further includes recognizing the utterance as the last utterance in a user turn of the multi-turn dialogue. At 212, responsive to the silence not exceeding the context-dependent duration, method 200 further includes determining that the turn of the multi-turn dialogue includes further utterances starting after the silence. Accordingly, after 212, method 200 may include returning to 204 to further analyze the audio data, in order to recognize further utterances followed by further silences.

The context-dependent duration may be dynamically updated based on any suitable analysis of any set of features of the received audio data and the conversation history. For example, the context-dependent duration may be dynamically updated based on operating one or more previously-trained models (e.g., AI, ML, NLP, and/or statistical models), such as previously-trained model 130 of FIG. 1 For example, the context-dependent duration may be dynamically updated based on features of the user's voice/speech delivery, the words uttered by the user, and/or any other suitable user interface events that occur while receiving audio data and/or that are recorded in the conversation history.

In some examples, as shown in FIG. 3A, a user may be silent for a period of time even though they may not be finished speaking. As such, a conversational computing interface may detect the end of a turn, although that turn may not yet be fully actionable based on information provided by the user. Accordingly, the conversational computing interface may be configured to determine, independently of whether a turn is ended, whether the turn is fully actionable, and responsive to the turn not being fully actionable, generating a response utterance based on the last utterance. For example, a previously-trained model may be trained based on training data including fully-actionable and not-fully actionable turns. In some examples, recognizing whether a turn is fully-actionable may include operating a previously-trained model to generate an action for responding to the utterance, and determining a confidence value for the prediction. For example, a turn may be considered to be fully-actionable if the confidence value for the prediction exceeds a pre-defined threshold, whereas the turn may be considered not fully-actionable if the confidence value for the prediction does not exceed the pre-defined threshold.

Conversational computing interface 102 is configured to operate model 130 to delineate turn boundaries in exemplary scenarios such as depicted in FIG. 3A. For example, based on operating method 20 and/or method 200 as described above, turn boundaries may be detected between silence 108A2 and response 110A1, between silence 108B2 and response 110B1, and between silence 108C2 and response 110C1.

After user utterance 108B1, the conversational computing interface allows for a long silence based on the user utterance 108B1 not yet providing information needed to fully respond to the user. However, as shown in FIG. 3A, even after a silence of 45 seconds, the user does not resume speaking. For example, the user may have been engaged with a different task. Accordingly, rather than wait indefinitely, the conversational computing interface may be configured to detect an end of the user's turn and to output response 110B1. As shown, response 110B1 informs the user that the conversational computing interface still needs to know which flight time the user prefers, and restates the options. Subsequently, the user re-engages with the conversation and in utterance 108C1, selects the "8 AM" option. Accordingly, the conversational computing interface is configured to immediately resume handling the user's request using the provided information, outputting response 110C1 after only a brief silence 108C2 of 1 second.

As shown in FIG. 3B, in some examples, the received audio further includes speech by one or more different users, in addition to the speech by the primary user described in the above examples. The speech by one or more different users may not be relevant to the conversation between the primary user and the conversational computing interface, thus posing a potentially difficult situation for delineating turns. For example, as shown in FIG. 3B, a user turn 108B may include interruptions by other speakers, as with other speaker utterance 108B2 in which a barista at a coffee shop responds to the user about a coffee order. Furthermore, in addition to interruptions by other speakers, a user turn 108C may include utterances by the primary speaker that are not addressed at the conversational computing interface, for example, as with user utterance 108C3 responding to the barista's question posed in other speaker utterance 108C2.

Nevertheless, a conversational computing interface according to the present disclosure is configured to delineate turns in multi-speaker situations, of which the conversation depicted in FIG. 3B is one non-limiting example. For example, a previously-trained model of the conversational computing interface may be trained on conversation histories in which a user's turn is interrupted, such as conversation history 106" depicted in FIG. 3B, thereby configuring the previously-trained model to recognize similar situations.

For example, as described above, the conversational computing interface may be configured to pre-process audio data and/or conversation history data to indicate, for each utterance in the audio data and/or conversation history, a speaker and/or an addressee associated with the utterance. Accordingly, in some examples, assessing turn boundaries may be based on providing the previously-trained model with features derived from a filtered subset of the utterances, for example, based only on utterances by the primary user in which the primary user is addressing the conversational computing interface.

Alternately or additionally, the previously-trained model may be trained to delineate turns for a primary user, based on assessing features derived from utterances in which the primary user was not the speaker and/or in which the conversational computing interface was not the addressee. In some examples, the previously-trained model may be trained based on exemplary audio data and conversation histories associated with multiple different speakers and/or in which speakers address multiple different addressees. For example, the conversation histories and/or audio data may be associated with labels indicating turns of the primary user (e.g., indicating a span of time and/or a set of utterances associated with a turn, which may include interruptions such as utterances by other users). For example, the exemplary conversation histories may include conversations in which the primary user was interrupted during the middle of a turn (e.g., as shown in user turn 108B and in user turn 108C), and/or in which the primary user addressed a different entity in the middle of a turn (e.g., as shown in user turn 108C).

The methods and processes described herein may be tied to a computing system of one or more computing devices. In particular, such methods and processes may be implemented as an executable computer-application program, a network-accessible computing service, an API, a library, or a combination of the above and/or other compute resources.

Figure 4:
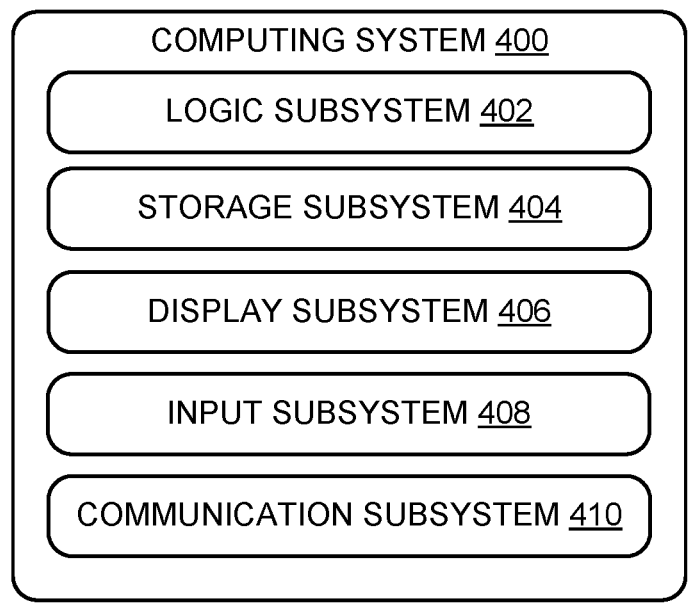
FIG. 4 shows an exemplary computing system.

FIG. 4 schematically shows a simplified representation of a computing system 400 configured to provide any to all of the compute functionality described herein. Computing system 400 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices. Computing system 400 is a non-limiting example of an embodiment of data-flow architecture 100 for a conversational computing interface 102 as shown in FIG. 1.

Computing system 400 includes a logic subsystem 402 and a storage subsystem 404. Computing system 400 may optionally include a display subsystem 406, input subsystem 408, communication subsystem 410, and/or other subsystems not shown in FIG. 4.

Logic subsystem 402 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 404 includes one or more physical devices configured to temporarily and/or permanently hold computer information such as data and instructions executable by the logic subsystem. When the storage subsystem includes two or more devices, the devices may be collocated and/or remotely located. Storage subsystem 404 may include volatile, nonvolatile, dynamic, static, read/write, read-only, random-access, sequential-access, location-addressable, file-addressable, and/or content-addressable devices. Storage subsystem 404 may include removable and/or built-in devices. When the logic subsystem executes instructions, the state of storage subsystem 404 may be transformed—e.g., to hold different data.

Aspects of logic subsystem 402 and storage subsystem 404 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

Machines may be implemented using any suitable combination of state-of-the-art and/or future ML, AI, statistical, and/or NLP techniques, for example via one or more previously-trained ML, AI, NLP, and/or statistical models. Non-limiting examples of techniques that may be incorporated in an implementation of one or more machines include support vector machines, multi-layer neural networks, convolutional neural networks (e.g., including spatial convolutional networks for processing images and/or videos, temporal convolutional neural networks for processing audio signals and/or natural language sentences, and/or any other suitable convolutional neural networks configured to convolve and pool features across one or more temporal and/or spatial dimensions), recurrent neural networks (e.g., long short-term memory networks), associative memories (e.g., lookup tables, hash tables, Bloom Filters, Neural Turing Machine and/or Neural Random Access Memory), word embedding models (e.g., GloVe or Word2Vec), unsupervised spatial and/or clustering methods (e.g., nearest neighbor algorithms, topological data analysis, and/or k-means clustering), graphical models (e.g., (hidden) Markov models, Markov random fields, (hidden) conditional random fields, and/or AI knowledge bases), and/or natural language processing techniques (e.g., tokenization, stemming, constituency and/or dependency parsing, and/or intent recognition, segmental models, and/or super-segmental models (e.g., hidden dynamic models)).

In some examples, the methods and processes described herein may be implemented using one or more differentiable functions, wherein a gradient of the differentiable functions may be calculated and/or estimated with regard to inputs and/or outputs of the differentiable functions (e.g., with regard to training data, and/or with regard to an objective function). Such methods and processes may be at least partially determined by a set of trainable parameters. Accordingly, the trainable parameters for a particular method or process may be adjusted through any suitable training procedure, in order to continually improve functioning of the method or process. A model may be "configured" as described herein based on training, e.g., by training the model with a plurality of training data instances suitable to cause an adjustment to the trainable parameters, resulting in a described configuration.

Non-limiting examples of training procedures for adjusting trainable parameters include supervised training (e.g., using gradient descent or any other suitable optimization method), zero-shot, few-shot, unsupervised learning methods (e.g., classification based on classes derived from unsupervised clustering methods), reinforcement learning (e.g., deep Q learning based on feedback) and/or generative adversarial neural network training methods, belief propagation, RANSAC (random sample consensus), contextual bandit methods, maximum likelihood methods, and/or expectation maximization. In some examples, a plurality of methods, processes, and/or components of systems described herein may be trained simultaneously with regard to an objective function measuring performance of collective functioning of the plurality of components (e.g., with regard to reinforcement feedback and/or with regard to labelled training data). Simultaneously training the plurality of methods, processes, and/or components may improve such collective functioning. In some examples, one or more methods, processes, and/or components may be trained independently of other components (e.g., offline training on historical data).

Language models may utilize vocabulary features to guide sampling/searching for words for recognition of speech. For example, a language model may be at least partially defined by a statistical distribution of words or other vocabulary features. For example, a language model may be defined by a statistical distribution of n-grams, defining transition probabilities between candidate words according to vocabulary statistics. The language model may be further based on any other appropriate statistical features, and/or results of processing the statistical features with one or more machine learning and/or statistical algorithms (e.g., confidence values resulting from such processing). In some examples, a statistical model may constrain what words may be recognized for an audio signal, e.g., based on an assumption that words in the audio signal come from a particular vocabulary.

Alternately or additionally, the language model may be based on one or more neural networks previously trained to represent audio inputs and words in a shared latent space, e.g., a vector space learned by one or more audio and/or word models (e.g., wav2letter and/or word2vec). Accordingly, finding a candidate word may include searching the shared latent space based on a vector encoded by the audio model for an audio input, in order to find a candidate word vector for decoding with the word model. The shared latent space may be utilized to assess, for one or more candidate words, a confidence that the candidate word is featured in the speech audio.

The language model may be used in conjunction with an acoustical model configured to assess, for a candidate word and an audio signal, a confidence that the candidate word is included in speech audio in the audio signal based on acoustical features of the word (e.g., mel-frequency cepstral coefficients, formants, etc.). Optionally, in some examples, the language model may incorporate the acoustical model (e.g., assessment and/or training of the language model may be based on the acoustical model). The acoustical model defines a mapping between acoustic signals and basic sound units such as phonemes, e.g., based on labelled speech audio. The acoustical model may be based on any suitable combination of state-of-the-art or future ML and/or AI models, for example: deep neural networks (e.g., long short-term memory, temporal convolutional neural network, restricted Boltzmann machine, deep belief network), hidden Markov models (HMM), conditional random fields (CRF) and/or Markov random fields, Gaussian mixture models, and/or other graphical models (e.g., deep Bayesian network). Audio signals to be processed with the acoustic model may be pre-processed in any suitable manner, e.g., encoding at any suitable sampling rate, Fourier transform, band-pass filters, etc. The acoustical model may be trained to recognize the mapping between acoustic signals and sound units based on training with labelled audio data. For example, the acoustical model may be trained based on labelled audio data comprising speech audio and corrected text, in order to learn the mapping between the speech audio signals and sound units denoted by the corrected text. Accordingly, the acoustical model may be continually improved to improve its utility for correctly recognizing speech audio.

In some examples, in addition to statistical models, neural networks, and/or acoustical models, the language model may incorporate any suitable graphical model, e.g., a hidden Markov model (HMM) or a conditional random field (CRF). The graphical model may utilize statistical features (e.g., transition probabilities) and/or confidence values to determine a probability of recognizing a word, given the speech audio and/or other words recognized so far. Accordingly, the graphical model may utilize the statistical features, previously trained machine learning models, and/or acoustical models to define transition probabilities between states represented in the graphical model.

Model(s) as described herein may incorporate any suitable combination of AI, ML, NLP, and/or statistical models. For example, a model may include one or more models configured as an ensemble, and/or one or more models in any other suitable configuration. Model(s) may be trained on any suitable data. For example, a model according to the present disclosure may include one or more AI, ML, NLP, and/or statistical models trained on labelled data from task-oriented conversations between humans. In some examples, the model may be trained in an "end-to-end" fashion, for example with regard to accuracy of predicting that an utterance is the last utterance in a user turn.

When included, display subsystem 406 may be used to present a visual representation of data held by storage subsystem 404. This visual representation may take the form of a graphical user interface (GUI). Display subsystem 406 may include one or more display devices utilizing virtually any type of technology. In some implementations, display subsystem may include one or more virtual-, augmented-, or mixed reality displays.

When included, input subsystem 408 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include one or more microphones for speech and/or voice recognition (e.g., an array of directional microphones); an infrared, color, stereoscopic, and/or depth camera for machine vision and/or gesture recognition; a head tracker, eye tracker, accelerometer, and/or gyroscope for motion detection and/or intent recognition.

When included, communication subsystem 410 may be configured to communicatively couple computing system 400 with one or more other computing devices. Communication subsystem 410 may include wired and/or wireless communication devices compatible with one or more different communication protocols. The communication subsystem may be configured for communication via personal-, local- and/or wide-area networks.

In an example, a method of automatically delineating turns in a multi-turn dialogue between a user and a conversational computing interface comprises receiving audio data encoding speech of the user in the multi-turn dialogue. In this or any other example, the method further comprises analyzing the received audio to recognize, in the speech of the user, an utterance followed by a silence. In this or any other example, the method further comprises recognizing the utterance as a last utterance in a turn of the multi-turn dialogue responsive to the silence exceeding a context-dependent duration dynamically updated based on a conversation history of the multi-turn dialogue and features of the received audio, wherein the conversation history includes one or more previous turns of the multi-turn dialogue taken by the user and one or more previous turns of the multi-turn dialogue taken by the conversational computing interface. In this or any other example, the features of the received audio include one or more acoustic features. In this or any other example, the one or more acoustic features include an intonation of the user relative to a baseline speaking pitch of the user. In this or any other example, the one or more acoustic features include one or more of 1) a baseline speaking rate for the user, 2) a speaking rate of the user in the utterance, and 3) a difference between a speaking rate of the user in the utterance and a baseline speaking rate for the user. In this or any other example, the features of the received audio include an end-of-sentence probability of a final n-gram in the utterance, the end-of-sentence probability of the final n-gram derived from a language model. In this or any other example, the features of the received audio include syntactic properties of a final n-gram in the utterance. In this or any other example, the features of the received audio include an automatically-recognized filler word from a pre-defined list of filler words. In this or any other example, dynamically updating the context-dependent duration based on the conversation history of the multi-turn dialogue is based at least on a semantic context derived from one or both of 1) a previous utterance by the user in the conversation history of the multi-turn dialogue and 2) a previous utterance by the conversational computing interface in the conversation history of the multi-turn dialogue. In this or any other example, the features of the received audio include one or more features of the utterance, selectively measured for an ending portion of the utterance. In this or any other example, dynamically updating the context-dependent duration based on the conversation history of the multi-turn dialogue is based at least on a measurement of a change in a feature occurring throughout the utterance. In this or any other example, the method further comprises determining, based on the last utterance in the turn of the multi-turn dialogue, whether the turn of the multi-turn dialogue is fully actionable, and responsive to the turn not being fully actionable, generating a response utterance based on the last utterance. In this or any other example, the received audio further includes speech by one or more different users, in addition to the speech by the user, and the method further comprises distinguishing between utterances by the user and speech by the one or more different users, and parsing the utterances from the user from the received audio, wherein the turn of the multi-turn dialogue includes only utterances by the user. In this or any other example, the utterance is one of a plurality of utterances separated by silences in the turn, the plurality of utterances automatically supplied by an automatic speech-recognition system configured to automatically segment audio into separate utterances. In this or any other example, analyzing the received audio includes operating a previously-trained natural language model trained on a plurality of exemplary task-oriented dialogues, each exemplary task-oriented dialogue including one or more turns of an exemplary user. In this or any other example, the previously-trained natural language model is a domain-specific model of a plurality of domain-specific models, wherein each domain-specific module is trained on a corresponding domain-specific plurality of exemplary task-oriented dialogues.

In an example, a computing system comprise a logic subsystem and a storage subsystem. In this or any other example, the storage system holds instructions executable by the logic subsystem. In this or any other example, the instructions are executable to receive audio encoding speech of a user in a multi-turn dialogue between the user and a conversational computing interface. In this or any other example, the instructions are executable to analyze the received audio to recognize, in the speech of the user, an utterance followed by a silence. In this or any other example, the instructions are executable to recognize the utterance as a last utterance in a turn of the multi-turn dialogue responsive to the silence exceeding a context-dependent duration dynamically updated based on a conversation history of the multi-turn dialogue and features of the received audio, wherein the conversation history includes one or more previous turns of the multi-turn dialogue taken by the user and one or more previous turns of the multi-turn dialogue taken by the conversational computing interface. In this or any other example, the computing system further comprises an array of directional microphones, wherein the received audio is received via the array of directional microphones, the received audio further includes speech by one or more different users, in addition to the speech by the user, and the instructions are further executable to assess a spatial location associated with utterances in the received audio, distinguishing between utterances by the user and speech by the one or more different users based on the assessed spatial location, and parsing the utterances from the user from the received audio, wherein the turn of the multi-turn dialogue includes only utterances by the user. In this or any other example, the computing system further comprises an audio speaker, wherein the instructions are further executable to determine, based on the last utterance in the turn of the multi-turn dialogue, whether the turn of the multi-turn dialogue is fully actionable, and responsive to the turn not being fully actionable, output a response utterance based on the last utterance via the audio speaker. In this or any other example, the computing system further comprises a microphone, wherein the utterance is one of a plurality of utterances separated by silences in the turn, the plurality of utterances automatically supplied by an automatic speech-recognition system configured to receive audio via the microphone, and to automatically segment the received audio into separate utterances.

In an example, a of automatically delineating turns in a multi-turn dialogue between a user and a conversational computing interface comprises receiving audio data encoding speech of the user in the multi-turn dialogue. In this or any other example, the method further comprises analyzing the received audio to recognize, in the speech of the user, an utterance followed by a silence. In this or any other example, the method further comprises dynamically updating a context-dependent silence duration based on a conversation history of the multi-turn dialogue, features of the received audio, and a semantic context derived from one or both of 1) a previous utterance by the user in the conversation history of the multi-turn dialogue and 2) a previous utterance by the conversational computing interface in the conversation history of the multi-turn dialogue. In this or any other example, the method further comprises responsive to the silence exceeding a context-dependent duration, recognizing the utterance as a last utterance in a turn of the multi-turn dialogue. In this or any other example, the method further comprises responsive to the silence not exceeding the context-dependent duration, recognizing the utterance as a non-final utterance of a plurality of utterances in the turn of the multi-turn dialogue and further analyzing the received audio to recognize one or more further utterances followed by one or more further silences.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method of automatically delineating turns in a multi-turn dialogue between a user and a conversational computing interface, comprising:

receiving audio data encoding speech of the user in the multi-turn dialogue;

analyzing the received audio to recognize, in the speech of the user, an utterance followed by a silence; and recognizing the utterance as a last utterance in a turn of the multi-turn dialogue responsive to the silence exceeding a context-dependent duration dynamically updated based on 1) one or more previous turns of the multi-turn dialogue taken by the user, and 2) one or more previous turns of the multi-turn dialogue taken by the conversational computing interface.

2. The method of claim 1, wherein the context-dependent duration is dynamically updated based at least on one or more acoustic features of the received audio.

3. The method of claim 2, wherein the one or more acoustic features include an intonation of the user relative to a baseline speaking pitch of the user.

4. The method of claim 2, wherein the one or more acoustic features include one or more of 1) a baseline speaking rate for the user, 2) a speaking rate of the user in the utterance, and 3) a difference between a speaking rate of the user in the utterance and a baseline speaking rate for the user.

5. The method of claim 1, wherein the context-dependent duration is dynamically updated based at least on an end-of-sentence probability of a final n-gram in the utterance, the end-of-sentence probability of the final n-gram derived from a language model.

6. The method of claim 1, wherein the context-dependent duration is dynamically updated based at least on syntactic properties of a final n-gram in the utterance.

7. The method of claim 1, wherein the context-dependent duration is dynamically updated based at least on an automatically-recognized filler word from a pre-defined list of filler words.

8. The method of claim 1, wherein the context-dependent duration is dynamically updated based at least on a semantic context derived from one or both of 1) a previous utterance by the user in a conversation history of the multi-turn dialogue and 2) a previous utterance by the conversational computing interface in the conversation history of the multi-turn dialogue.

9. The method of claim 1, wherein the context-dependent duration is dynamically updated based at least on one or more features of the utterance, selectively measured for an ending portion of the utterance.

10. The method of claim 1, wherein the context-dependent duration is dynamically updated based at least on a measurement of a change in a feature occurring throughout the utterance.

11. The method of claim 1, further comprising determining, based on the last utterance in the turn of the multi-turn dialogue, whether the turn of the multi-turn dialogue is fully actionable, and responsive to the turn not being fully actionable, generating a response utterance based on the last utterance.

12. The method of claim 1, wherein the received audio further includes speech by one or more different users, in addition to the speech by the user, and the method further comprises distinguishing between utterances by the user and speech by the one or more different users, and parsing the utterances from the user from the received audio, wherein the turn of the multi-turn dialogue includes only utterances by the user.

13. The method of claim 1, wherein the utterance is one of a plurality of utterances separated by silences in the turn, the plurality of utterances automatically supplied by an automatic speech-recognition system configured to automatically segment audio into separate utterances.

14. The method of claim 1, wherein analyzing the received audio includes operating a previously-trained natural language model trained on a plurality of exemplary task-oriented dialogues, each exemplary task-oriented dialogue including one or more turns of an exemplary user.

15. The method of claim 14, wherein the previously-trained natural language model is a domain-specific model of a plurality of domain-specific models, wherein each domain-specific module is trained on a corresponding domain-specific plurality of exemplary task-oriented dialogues.

16. A computing system, comprising:
a logic subsystem; and
a storage subsystem holding instructions executable by the logic subsystem to:
receive audio encoding speech of a user in a multi-turn dialogue between the user and a conversational computing interface;
analyze the received audio to recognize, in the speech of the user, an utterance followed by a silence; and
recognize the utterance as a last utterance in a turn of the multi-turn dialogue responsive to the silence exceeding a context-dependent duration dynamically updated based 1) one or more previous turns of the multi-turn dialogue taken by the user, and 2) one or more previous turns of the multi-turn dialogue taken by the conversational computing interface.

17. The computing system of claim 16, further comprising an array of directional microphones, wherein the received audio is received via the array of directional microphones, the received audio further includes speech by one or more different users, in addition to the speech by the user, and the instructions are further executable to assess a spatial location associated with utterances in the received audio, distinguishing between utterances by the user and speech by the one or more different users based on the assessed spatial location, and parsing the utterances from the user from the received audio, wherein the turn of the multi-turn dialogue includes only utterances by the user.

18. The computing system of claim 16, further comprising an audio speaker, wherein the instructions are further executable to determine, based on the last utterance in the turn of the multi-turn dialogue, whether the turn of the multi-turn dialogue is fully actionable, and responsive to the turn not being fully actionable, output a response utterance based on the last utterance via the audio speaker.

19. The computing system of claim 16, further comprising a microphone, wherein the utterance is one of a plurality of utterances separated by silences in the turn, the plurality of utterances automatically supplied by an automatic speech-recognition system configured to receive audio via the microphone, and to automatically segment the received audio into separate utterances.

20. A method of automatically delineating turns in a multi-turn dialogue between a user and a conversational computing interface, comprising:
receiving audio data encoding speech of the user in the multi-turn dialogue;
analyzing the received audio to recognize, in the speech of the user, an utterance followed by a silence;
dynamically updating a context-dependent silence duration based on a conversation history of the multi-turn dialogue, features of the received audio, and a semantic context derived from one or both of 1) a previous utterance by the user in the conversation history of the multi-turn dialogue and 2) a previous utterance by the conversational computing interface in the conversation history of the multi-turn dialogue;

responsive to the silence exceeding a context-dependent duration, recognizing the utterance as a last utterance in a turn of the multi-turn dialogue; and responsive to the silence not exceeding the context-dependent duration, recognizing the utterance as a non-final utterance of a plurality of utterances in the turn of the multi-turn dialogue and further analyzing the received audio to recognize one or more further utterances followed by one or more further silences.

* * * * *